(12) United States Patent
Vakil

(10) Patent No.: US 6,964,546 B1
(45) Date of Patent: Nov. 15, 2005

(54) METHOD AND APPARATUS FOR DRILLING COUNTERSUNK HOLES

(75) Inventor: Kumun R. Vakil, Rancho Palos Verdes, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 479 days.

(21) Appl. No.: 10/163,130

(22) Filed: Jun. 4, 2002

(51) Int. Cl.[7] ............................................. B23B 45/00
(52) U.S. Cl. .................... 408/110; 408/130; 408/1 R; 408/224
(58) Field of Search ................. 408/110, 112, 223, 408/224, 225, 202, 241 S, 712, 130, 1 R

(56) References Cited

U.S. PATENT DOCUMENTS

| | | | |
|---|---|---|---|
| 730,670 A | 6/1903 | Luckhurst | |
| 2,301,151 A | * 11/1942 | Spievak | 408/112 |
| 2,359,859 A | * 10/1944 | Jarvis | 408/112 |
| 2,362,260 A | 11/1944 | Foster | 77/66 |
| D139,844 S | 12/1944 | Smith | D54/14 |
| 2,429,375 A | 10/1947 | Smith | 279/102 |
| 2,488,992 A | * 11/1949 | Taylor | 188/313 |
| 2,674,098 A | * 4/1954 | Taylor | 173/155 |
| 2,868,044 A | * 1/1959 | Chaffee et al. | 408/110 |
| 2,994,235 A | * 8/1961 | Rise | 408/112 |
| 3,397,600 A | * 8/1968 | Wells | 408/112 |
| 4,093,395 A | 6/1978 | Luebbert et al. | 408/224 |
| 4,449,865 A | 5/1984 | Yankovoy et al. | 408/1 R |
| 4,662,803 A | 5/1987 | Arnold | 408/224 |
| 5,071,293 A | * 12/1991 | Wells | 408/112 |
| 5,482,410 A | 1/1996 | Chambers | 408/1 R |
| 5,570,978 A | * 11/1996 | Rees et al. | 408/144 |

FOREIGN PATENT DOCUMENTS

| | | | | |
|---|---|---|---|---|
| EP | 0 743 142 A1 | 11/1996 | | B25G 1/02 |
| EP | 0936016 | * 8/1999 | | B23B 51/02 |

* cited by examiner

Primary Examiner—Daniel W. Howell
(74) Attorney, Agent, or Firm—Fulbright & Jaworski LLP

(57) ABSTRACT

A drilling apparatus includes a drill, a surge control device and a countersink limiter coupled to the drill, and a rotatable cutting tool coupled to the countersink limiter. The cutting tool includes a drilling portion operable to form a hole, a countersink portion operable to form a countersink, and a fillet portion operable to form a longitudinally-curved transition between the hole and the countersink. The depth of the countersink is controlled by the countersink limiter. The surge control device is operable to control the axial speed of the cutting tool.

26 Claims, 4 Drawing Sheets

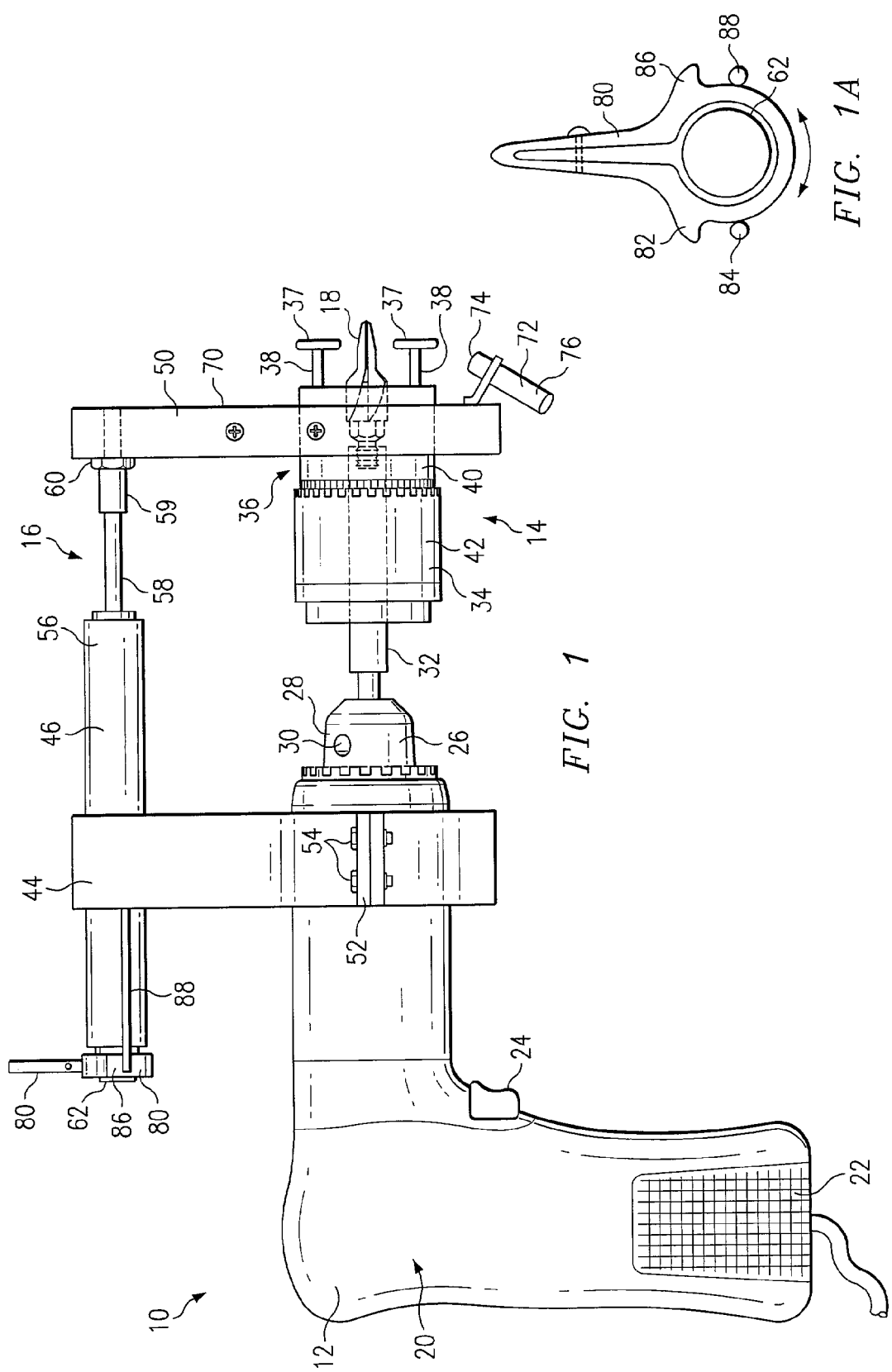

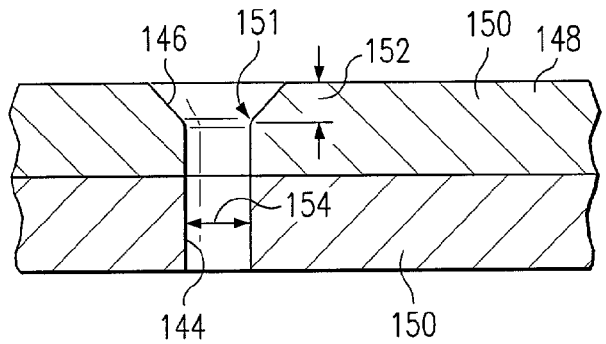
FIG. 3
FIG. 4
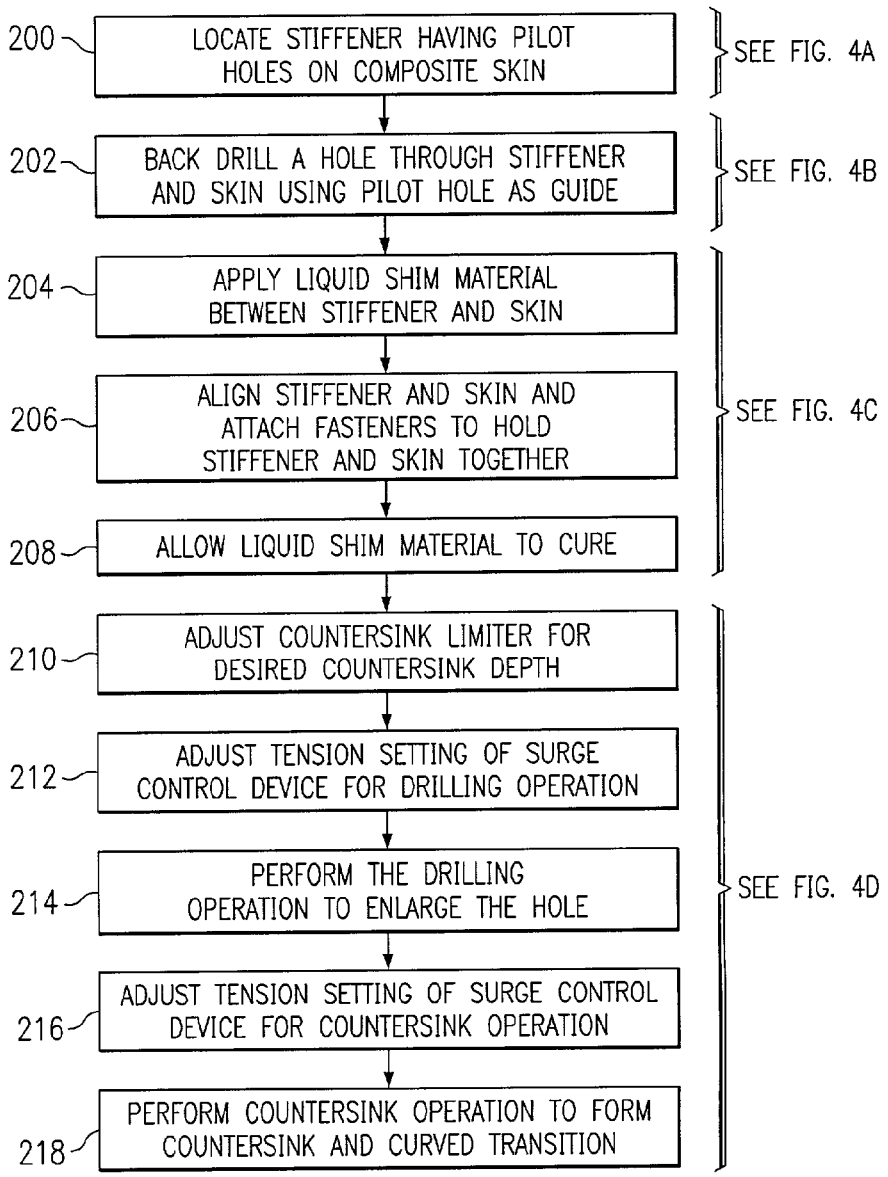

US 6,964,546 B1

METHOD AND APPARATUS FOR DRILLING COUNTERSUNK HOLES

TECHNICAL FIELD OF THE INVENTION

This invention relates generally to the field of drilling and, more specifically, to a method and apparatus for drilling countersunk holes.

BACKGROUND OF THE INVENTION

Composite structures are desirable in many industries for many applications. For example, aircraft, space, and land/sea vehicles employ a variety of curved and multiple-contoured surface structures in their fabrication. Composite materials are commonly used for these structures because, among other desirable attributes, composite materials have high strength-to-weight ratios. Although composite materials possess high strength-to-weight ratios, the composite structures they are used to form are sometimes strengthened or stiffened using various types of stiffeners, such as ribs, spars, hats, or other structural members.

Stiffeners are attached to composite structures in many different manners. One such manner is by fastening with fasteners such as bolts or rivets. Since fasteners are typically inserted into holes, a drilling operation must be performed on the composite material. In addition, depending on the application for the composite structure, a countersink operation may have to be performed on the composite material.

SUMMARY OF THE INVENTION

In accordance with the present invention, a method and apparatus for drilling countersunk holes are provided that substantially eliminate or reduce the disadvantages and problems associated with previously developed methods and apparatuses. More specifically, a drilling apparatus includes a cutting tool that performs the operations of forming or expanding a hole, forming a countersink, and forming a curved transition between the hole and the countersink. The drilling apparatus may also include a countersink limiter, such as a countersink cage, that controls the depth of the countersink and a surge control device that controls the axial speed, or feed, of the cutting tool during operation.

In one embodiment of the present invention, a drilling apparatus includes a drill, a surge control device and a countersink limiter coupled to the drill, and a rotatable cutting tool coupled to the countersink limiter. The cutting tool includes a drilling portion operable to form a hole, a countersink portion operable to form a countersink, and a fillet portion operable to form a longitudinally-curved transition between the hole and the countersink. The depth of the countersink is controlled by the countersink limiter. The surge control device is operable to control the axial speed of the cutting tool.

In another embodiment, a cutting tool includes a body and a mounting portion. The body includes a drilling portion, a countersink portion, and a fillet portion. The drilling portion is operable to form a hole. The countersink portion is coupled to the drilling portion and is operable to form a countersink having a depth. The fillet portion is disposed between the drilling portion and the countersink portion and is operable to form a longitudinally-curved transition between the hole and the countersink. The mounting portion is coupled to the body and is operable to be coupled to a countersink limiter.

In yet another embodiment, a method of forming a hole and countersink in a composite material is provided. The method includes using a first cutting tool to drill a hole along an axis. The method further includes using a second cutting tool to enlarge the diameter of the hole, form a countersink, and form a longitudinally-curved transition between the countersink and the second hole. A surge control device may be used to control the axial speed of the second cutting tool.

Various embodiments of the present invention may benefit from numerous technical advantages. It should be noted that one or more embodiments may benefit from all, some, or none of the advantages discussed below.

One technical advantage is that a single cutting tool may be used to perform the functions of forming or expanding a hole, forming a countersink, and forming a smooth transition between the hole and the countersink. In addition, these functions may all be performed in a single operation. This eliminates the need to perform separate operations using separate drills or exchange the cutting tools in the drill to perform these separate functions, thus saving both time and money. In addition, the dimensional accuracy and consistency of holes and countersinks formed using a single cutting tool is greater than those formed using multiple cutting tools, which is particularly important in applications requiring small tolerances.

Another technical advantage includes providing a cutting tool that includes generally longitudinal cutting sections separated by generally longitudinal channels, or flutes. This longitudinal configuration allows dust or grind produced by the cutting process to be removed from the hole during the cutting process. A vacuum hose may be attached to the drilling apparatus to suck the dust or grind away from the cutting area. Thus, the longitudinal configuration allows a hole to be drilled and reamed in a single process as opposed to two separate processes.

Yet another technical advantage includes providing a drilling apparatus that includes a surge control device operable to control the axial speed, or feed, at which the cutting tool may travel through the workpiece. Controlling the feed of the cutting tool is advantageous when performing drilling and/or countersink operations in certain materials. For example, controlling the feed of the cutting tool is particularly important for performing drilling and/or countersink operations in composite materials in order to prevent the composite materials from delaminating or otherwise being damaged.

Still another technical advantage includes providing a surge control device operable to be activated and deactivated during particular cutting operations. For example, the surge control device may be activated during cutting operations in which control of the feet of the cutting tool is important and deactivated during cutting operations in which controlling the feet of the cutting tool is less important. The surge control device may include a manual or automatic switch to activate and deactivate the surge control device. In some embodiments, the switch is operable to activate the surge control device during drilling of a hole and deactivate the surge control device during formation of a countersink in the hole.

Still another technical advantage includes providing a drilling apparatus that includes a cutting tool that can expand an existing hole and form a countersink and a smooth transition between the hole and the countersink in a single operation, a surge control device, and a countersink limiter operable to control the depth of the countersink. This drilling apparatus is particularly useful in aerospace applications, such as forming holes and countersinks for attaching stiffeners to composite skins.

Other technical advantages are readily apparent to one of ordinary skill in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which:

FIG. 1 is a schematic of a drilling apparatus in accordance with an embodiment of the present invention;

FIG. 3 is a partial side view of a hole and countersink formed by the cutting tool of FIGS. 2A and 2B;

FIG. 4 is flowchart illustrating a method of using the drilling apparatus of FIG. 1;

DETAILED DESCRIPTION OF THE DRAWINGS

Figure 2A:
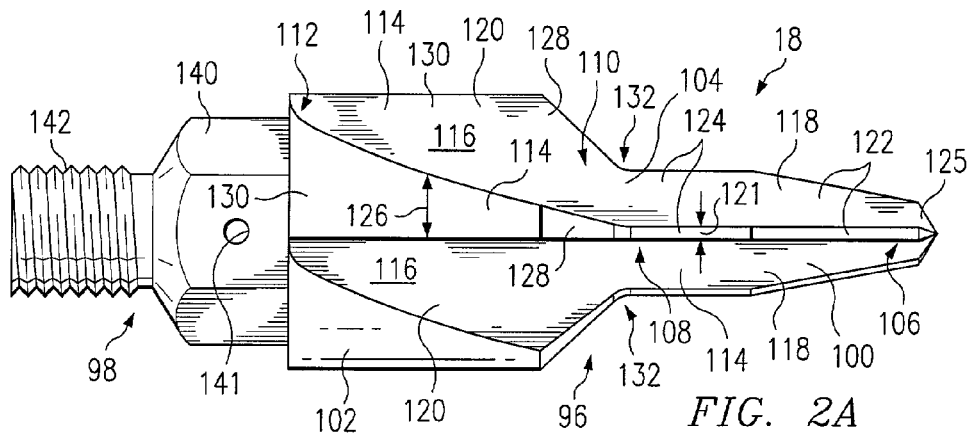
FIG. 2A is a schematic of a cutting tool used in the drilling apparatus of FIG. 1.

Example embodiments of the present invention and their advantages are best understood by referring now to FIGS. 1 through 4D of the drawings, in which like numerals refer to like parts.

In general, a rotatable cutting tool is provided that can be used in a drilling apparatus to drill a hole or enlarge an existing hole and to form a countersink and a curved transition between the countersink and the hole. The cutting tool may be used with a drilling apparatus that includes a surge control device that controls the axial speed of the cutting tool as an axial force is applied to the drilling apparatus. This is particularly useful when drilling into composite materials since such materials may delaminate if the axial speed of the cutting tool is too great. The drilling apparatus may also include an adjustable countersink limiter, such as a countersink cage, to control the depth of the countersink formed by the cutting tool. In addition, the cutting tool may have generally longitudinal cutting sections which allows grind or other debris to exit the drilling area during the drilling process.

FIG. 1 illustrates one embodiment of a drilling apparatus 10 that includes a drill 12, a countersink limiter 14 and a surge control device 16 coupled to drill 12, and a rotatable cutting tool 18 coupled to countersink limiter 14. Drill 12 includes a drill motor 20, a power source 22, an activation trigger 24, and a rotating portion 26. Drill motor 20 may be a standard drill motor, such as a 2700 rpm drill motor for example. Power source 22 may be a battery or an external power source, such as air pressure provided through an air hose, electricity provided through a power cord, or any other suitable power source for operating drill motor 20. Rotating portion 26 may include a drill chuck 28 operable to receive a shaft to be rotated, such as a drill bit or a shank of a countersink limiter, for example. Drill chuck 28 may be opened and closed by inserting and rotating a chuck key into a key hole 30.

Countersink limiter 14 is operable to control the depth of a countersink formed by cutting tool 18. Countersink limiter 14 includes a shank 32 rotatably coupled to a cage body 34. As shown in FIG. 1, a first end of shank 32 may be received and held in drill chuck 28. A second end of shank 32 may receive cutting tool 18 such that shank 32 and cutting tool 18 rotate along with rotating portion 26 when drill motor 20 is activated by activation trigger 24. Shank 32 is operable to travel axially with respect to cage body 34 for a particular distance that is controlled by a countersink depth control mechanism 36. Cage body 34 may include one or more leading surfaces 37 that contact the surface of the workpiece to be drilled. In the embodiment shown in FIG. 1, cage body 34 includes legs 38 that provide leading surfaces 37.

Countersink depth control mechanism 36 may be adjusted to select the maximum axial distance that the countersink portion of cutting tool 18 may extend beyond leading surfaces 37. In particular, countersink depth control mechanism 36 may include a first body portion 40 that may be rotated relative to a second body portion 42 in order to control the axial distance that shank 32 may travel within cage body 34, and thus the maximum axial distance that the countersink portion of cutting tool 18 may extend beyond leading surfaces 37. Since the depth of the countersink that may be formed by cutting tool 18 is limited by the axial distance that the countersink portion of cutting tool 18 extends beyond leading surfaces 37, countersink depth control mechanism 36 effectively controls the countersink depth. In one embodiment, countersink depth control mechanism 36 is a microstop mechanism in which first body portion 40 may be rotated relative to second body portion 42 to select a desired countersink depth within 1/1000 of an inch.

Surge control device 16 operates to control the axial speed (which may be referred to as the "feed") of cutting tool 18 during the operation of drilling apparatus 10. In the embodiment shown in FIG. 1, surge control device 16 includes a housing 44, a hydraulic damper 46, and a shoe 50. Housing 44 is coupled to drill 12 by a clamp 52 that may be coupled to drill 12 using one or more fasteners 54, such as screws or bolts, for example. Hydraulic damper 46 is fixed within housing 44 and includes a hydraulic cylinder 56 and a plunger 58. Plunger 58 may be coupled to a recessed member 59 that may coupled to shoe 50 by any suitable means, such as by welding or using fasteners or adhesives. For example, in the embodiment shown in FIG. 1, recessed member 59 is coupled to shoe 50 using a threaded fastener 60.

Surge control device 16 may also include a pressure control knob 62 that may be rotated to control the tension setting of surge control device 16, or in other words, to control the axial force required to move plunger 58 relative to hydraulic cylinder 56. Increasing the tension setting of surge control device 16 provides greater resistance against an axial force applied to drill 12, and thus decreases the axial speed, or feed, at which drill 12 and cutting tool 18 may travel during drilling and countersink operations. Likewise, decreasing the tension setting provides less resistance and increases the axial speed at which drill 12 and cutting tool 18 may travel. The surge control tension setting may be selected based on one or more criteria, such as for example, the material properties and dimensions of the workpiece, the material properties and dimensions of cutting tool 18, and whether or not cutting tool 18 is being used to drill a new hole or expand an existing hole. It should be understood that surge control device 16 may include additional hydraulic dampers or any other suitable means of controlling the axial speed, or feed, of cutting tool 18, such as, for example, springs or compressible materials.

A lever 80 may be coupled to pressure control knob 62 such that pressure control knob 62 may be rotated by moving lever 80. FIG. 1A illustrates a front view of lever 80 according to an embodiment of the present invention. As shown in FIGS. 1 and 1A, lever 80 may include a first stop portion 82 that may limit the rotation of lever 80 (and thus pressure control knob 62) when first stop portion 82 contacts a first stop bar 84, and a second stop portion 86 that may limit the rotation of lever 80 (and thus pressure control knob 62) when second stop portion 86 contacts a second stop bar 88. Lever 80 may be rotated to a drilling position in which first stop portion 82 contacts a first stop bar 84 and a countersink position in which second stop portion 86 contacts a second stop bar 88. In some embodiments or applications, surge control device 16 is activated when lever 80 is rotated to the drilling position and deactivated when lever 80 is rotated to the countersink position. In other embodiments or applications, surge control device 16 provides a first amount of resistance when lever 80 is rotated to the drilling position and a second amount of resistance when lever 80 is rotated to the countersink position. In a particular embodiment, surge control device 16 is set to approximately 20 pounds of resistance when lever 80 is in the drilling position.

Shoe 50 may provide additional support to drilling apparatus 10. For example, shoe 50 may be coupled to cage body 34 of countersink limiter 14 such that cage body 34 does not rotate during the operation of drill 12. In one embodiment, shoe 50 is coupled to cage body 34 using one or more fasteners 64, such as screws or bolts. However, shoe 50 may be coupled to cage body 34 using any other suitable means, such as by welding or using adhesives.

In the embodiment shown in FIG. 1, leading surfaces 37 of cage body 34 extend beyond a forward surface 70 of shoe 50 such that leading surfaces 37 of cage body 34 come in direct contact with the surface of the workpiece during drilling and countersink operations. In another embodiment, leading surfaces 37 of cage body 34 are substantially flush with forward surface 70 of shoe 50 such that a greater surface area may be in contact with the workpiece during drilling and countersink operations. In addition, forward surface 70 of shoe 50 may be flat or curved depending on the contour of the material to be drilled. For example, shoe 50 may have a curved forward surface 70 in order to provide additional support for drilling holes in a contoured airplane skin.

In addition, shoe 50 may include a hollow portion 72 for removing dust or grind from the cutting area during cutting operations. A first end 74 of hollow portion 72 may extend proximate the cutting area. A second end 76 of hollow portion 72 may be operable to be coupled to a vacuum hose in order to remove the dust or grind away from the cutting area.

In operation, a user may position drilling apparatus 10 such that leading surfaces 37 of cage body 34 come in contact with the material to be drilled into. Lever 80 may be aligned in the drilling position to activate surge control device 16. The user may engage activation trigger 24 to cause drill motor 20 to rotate rotating portion 26, shank 32, and cutting tool 18. The user may apply axial force to drill 12 in a direction toward the material to be drilled. The force applied by the user is resisted by hydraulic damper 46 such that the axial speed, or feed, of drill 12 is controlled. As discussed above, the resistance provided by hydraulic damper 46 may be controlled by pressure control knob 62. Thus, surge control device 16 controls the axial speed at which cutting tool 18 may move through the material to be drilled. Controlling the feed of the cutting tool is particularly important when performing drilling and/or countersink operations in certain materials. In particular, when cutting into composite materials, it is important to control the feed of the cutting tool in order to prevent the composite material from delaminating or otherwise being damaged.

In some applications, it is desirable to control the feed of cutting tool 18 during particular cutting operations but not during others. For example, it may be desirable to control the feed of cutting tool 18 during the drilling portion but not during the countersink portion of a cutting operation. In such situations, lever 80 may be adjusted to control the resistance provided by surge control device 16 or to completely deactivate surge control device 16 during particular operations.

FIG. 2A illustrates an example embodiment of cutting tool 18. Cutting tool 18 is operable to drill a new hole or expand an existing hole, and to form a countersink and a curved transition between the hole and the countersink. For reference, FIG. 3 illustrates a hole and countersink formed by cutting tool 18.

In the embodiment shown in FIG. 2A, cutting tool 18 includes a cutting tool body 96 and a mounting portion 98. Cutting tool body 96 includes a drilling portion 100, a countersink portion 102, and a fillet portion 104 disposed between drilling portion 100 and countersink portion 102. Drilling portion 100 includes a first end 106 and a second end 108, and countersink portion 102 includes a first end 110 and a second end 112.

Drilling portion 102 and countersink portion 104 are at least partially defined by a plurality of generally longitudinal cutting sections 114 separated by a plurality of generally longitudinal channels, or flutes, 116. In the embodiment shown in FIG. 2A, cutting tool 18 includes four longitudinal cutting sections 114 separated by four longitudinal channels 116. In this embodiment, each cutting section 114 extends from a point adjacent first end 106 of drilling portion 100 to a point adjacent second end 112 of countersink portion 102. In addition, each cutting section 114 includes a first portion 118 corresponding to, or at least partially defining, drilling portion 100, and a second portion 120 corresponding to, or at least partially defining, countersink portion 102.

The first portion 118 of each cutting section 114 extends in a generally longitudinal direction and has a substantially constant thickness 121. In addition, as shown in FIG. 2A, each first portion 118 may include a tapered portion 122 and a generally non-tapered portion 124. In another embodiment, first portion 118 does not include a generally non-tapered portion. In yet another embodiment, each first portion 118 includes multiple portions being tapered at different angles.

As shown in FIG. 2A, cutting tool 18 may include a leading tip 125 at the first end 106 of portion 100. In one embodiment, leading tip 125 is formed by the plurality of first portions 118. In particular, each first portion 118 may include a tip portion having a more severe taper than that of tapered portion 122. Leading tip 125 may be designed to fit inside a hole having a particular diameter. For example, in one embodiment, leading tip 125 is designed to fit inside a hole having a diameter of about 0.128 inches.

Like first portion 118, second portion 120 of each cutting section 114 extends in a generally longitudinal direction. However, each second portion 120 has a varying thickness 126. In the embodiment shown in FIG. 2A, second portion 120 increases from a first thickness at a point adjacent first end 110 of countersink portion 102 to a second thickness at a point adjacent second end 112 of countersink portion 102. In another embodiment, the thickness of the second portion 120 of each cutting section 114 is substantially constant.

Also like first portion 118, second portion 120 may include a tapered portion 128 and a generally non-tapered portion 130. In another embodiment, second portion 120 does not include a generally non-tapered portion. In yet another embodiment, each second portion 120 includes multiple portions being tapered at different angles.

The longitudinal configuration of cutting sections 114 and channels 116 allows dust or grind produced by the cutting process to be removed from the hole during the drilling process. As discussed above with reference to FIG. 1, this grind or other debris may removed using a vacuum connected to drilling apparatus 10. Thus, the longitudinal configuration allows a hole to be drilled and reamed in a single step as opposed to two separate steps.

Fillet portion 104 of cutting tool body 96 includes a plurality of fillets 132, each formed between the first portion 118 and second portion 120 of each cutting section 114. As shown in FIG. 2A, each fillet 132 may be formed between the generally non-tapered portion 124 of first portion 118 and the tapered portion of second portion 120 of each cutting section 114. Fillets 132 may be curved and may have a particular radius, identified with reference to FIG. 2B below as dimension K. In addition, fillets 132 may provide a smooth transition between the first portion 118 and second portion 120 of each cutting section 114 such that a sharp edge is not formed between the hole and the countersink formed by cutting tool 18, as further discussed below with reference to FIG. 3.

Cutting tool body 96 may be formed from one or more suitable materials such that cutting tool 18 may be used to form many countersunk holes before requiring re-sharpening and/or to provide a long usable lifespan for cutting tool 18. For example, cutting tool 18, or at least the cutting portions of cutting tool 18, may be formed from carbide material which provides a long tool life and requires re-sharpening only after many uses of cutting tool 18. In one embodiment, cutting tool body 96 is formed from 10% micrograin carbide. However, cutting tool 18 may be formed from any other suitable materials based on one or more criteria, such as desired or required strength, brittleness, durability, thermal properties, ease of manufacture, and cost.

Mounting portion 98 is operable to couple cutting tool 18 to shank 32 of countersink limiter 14. In the embodiment shown in FIG. 2A, mounting portion 98 is coupled to cutting tool body 96 adjacent second end 112 of countersink portion 102 and includes a nut portion 140 and a threaded portion 142. Threaded portion 142 may be inserted into and removed from a threaded portion of shank 32 by rotating nut portion 140 with a wrench or other suitable tool. Nut portion 140 may include a hole 141 that may be used to insert and/or remove cutting tool 18 from countersink limiter 14. In one embodiment, hole 141 is a 3/16 inch through hole. Mounting portion 98 may be formed from one or more materials suitable for forming a nut and a threaded portion, such as steel or other strong metals. In one embodiment, mounting portion 98 is formed separately from and welded to cutting tool body 96. In another embodiment, threaded portion 142 is formed separately from and welded to nut portion 140. It should be understood that mounting portion 98 may be modified in any suitable manner to be coupled to a variety of different countersink cages or limiters.

Alternative embodiments of cutting tool 18 have a variety of dimensions for a variety of applications. For example, some embodiments of cutting tool 18 may be used in particular aerospace applications, such as attaching a stiffener to a composite skin such as described in detail below with reference to FIGS. 4 through 4D. The dimensions of two such embodiments of cutting tool 18 are described in Table 1 below, which reference to FIG. 2B.

Figure 2B:
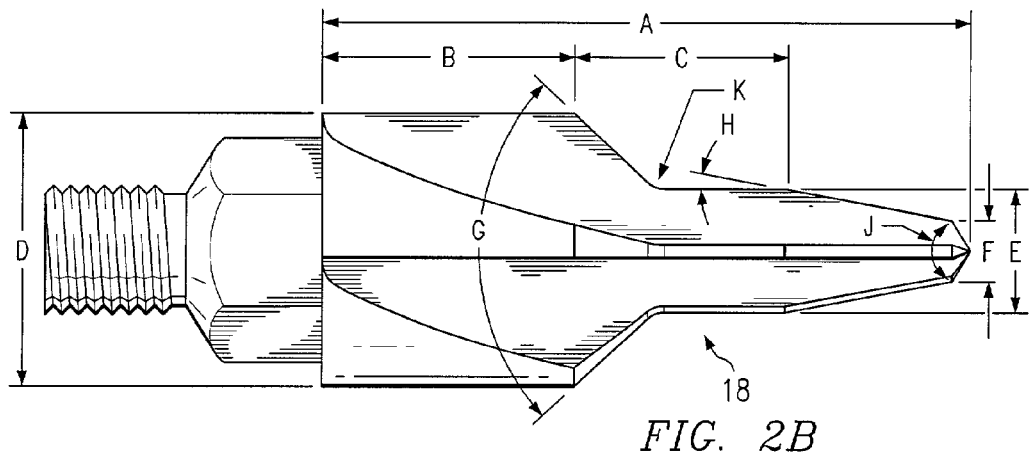
FIG. 2B is another schematic of the cutting tool of FIG. 2A illustrating various example dimensions of the cutting tool.

As shown in FIG. 2B, dimension A is the approximate length of cutting tool body 96. Dimension B is the approximate length of the generally non-tapered portion 130 of second portion 120 of cutting tool body 96. Dimension C is the approximate axial distance from the transition between tapered portion 128 and generally non-tapered portion 130 of second portion 120 and the transition between tapered portion 122 and generally non-tapered portion 124 of first portion 118. Dimension D is the approximate diameter of the generally non-tapered portion 130 of second portion 120. Dimension E is the approximate diameter of the generally non-tapered portion 124 of first portion 118. Dimension F is the approximate diameter of drilling portion 100 at the transition between leading tip 125 and tapered portion 122 of first portion 118. Dimension G is the approximate angle between the tapered portions 128 of the second portions 120 of opposing cutting sections 114, which may be called the countersink angle. Dimension H is the approximate angle between the tapered portion 122 and the generally non-tapered portion 124 of the first portion 118 of one of the cutting sections 114. Dimension J is the approximate angle between the tapered tip portions of opposing cutting sections 114, which may be referred to as the angle of leading tip 125. Dimension K is the approximate radius of each fillet 132.

TABLE 1

Dimensions of example embodiments of cutting tool 18.

| Example embodiment | A | B ±.001 | C +.030−0 | D ±.001 | E +.0002−0 | F +.0001−0 | G ±2° | H ±2° | J ±2° | K ±.001 |
|---|---|---|---|---|---|---|---|---|---|---|
| 1 | 1.218" | .500" | 400" | .500" | .190" | .128" | 100° | 8°/9° | 118 | .030°/.040° |
| 2 | 1.218" | .500" | .400" | 500" | .190" | .128" | 130° | 8°/9° | 118 | .030°/.040° |

Figure 2C:
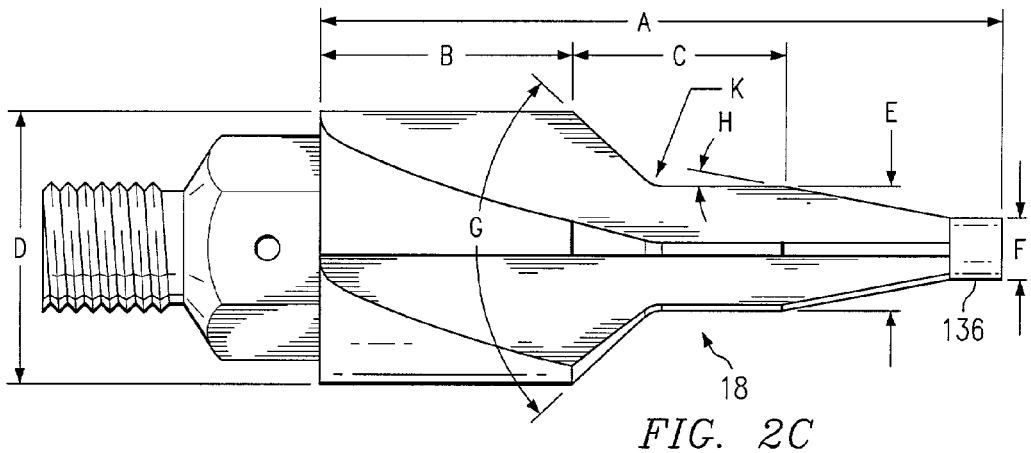
FIG. 2C is a schematic of a cutting tool having a pilot portion used in the drilling apparatus of FIG. 1.

FIG. 2C is a example embodiment of a cutting tool 134 similar to cutting tool 18 and including a pilot portion 136 located at the leading end of cutting tool 134. Pilot portion 136 may be a non-cutting portion operable to be inserted into a pilot hole. Pilot portion 136 may provide one or more advantages, including aligning cutting tool 134 with the pilot hole, ensuring perpendicularity of the drilled hole and countersink with the cutting surface, and stabilizing cutting tool 134 during the drilling operation. Thus, pilot portion 136 may have a diameter (see dimension F in FIG. 2C) equal to or slightly smaller than the diameter of the pilot hole. Thus, in some applications in which pilot holes having a 0.128 inch diameter are used, cutting tool 134 as shown in FIG. 2C may have identical or similar dimensions as shown in Table 1, with dimension F equal to or slightly less than 0.128 inches.

FIG. 3 illustrates a profile of a hole 144 and a countersink 146 that may be formed in a workpiece 148 by cutting tool 18 or 134. Workpiece 148 may include a plurality of layers 150, which may be formed from a variety of materials. In particular, one or more layers 150 may be formed from composite materials. In a particular application discussed below with reference to FIGS. 4 through 4D, layers 150 include a stiffener layer and a composite skin layer.

Drilling portion 100 of cutting tool 18 or 134 may form hole 144 and countersink portion 102 may form countersink 146. In addition, fillet portion 104 may form a longitudinally-curved transition 151 between hole 144 and countersink 146. Transition 151 eliminates the sharp transition which would be formed between hole 144 and countersink 146 without fillet portion 104. Such a sharp transition may be undesirable because it may provide an area of high stress or may enable a composite material to delaminate or provide a point of initiation for such delamination.

The depth 152 of countersink 146 is determined by the depth setting on countersink limiter 14, as discussed above with reference to FIG. 1. The diameter 154 of hole 144 will generally be equal to or slightly greater than the diameter of the generally non-tapered portion 124 of first portion 118 of cutting tool 18 or 134 (discussed above as dimension E). As discussed below in greater detail, an embodiment of cutting tool 18 or 134 may be used in a particular application to expand the diameter of an existing hole from about 0.128 inches to about 0.190 inches.

Thus, it should be understood that in some embodiments, a single cutting tool 18 or 134 is operable to perform the three functions of forming hole 144, forming countersink 146, and forming transition 151, all in a single operation. This eliminates the need to perform separate operations using separate drills or exchanging the cutting tools attached to the drill to perform these separate functions, thus saving both time and money. In addition, the dimensional accuracy and consistency of holes and countersinks formed using a single cutting tool 18 or 134 is greater than those formed using multiple cutting tools, which is particularly important in applications requiring small tolerances.

Figure 4A:
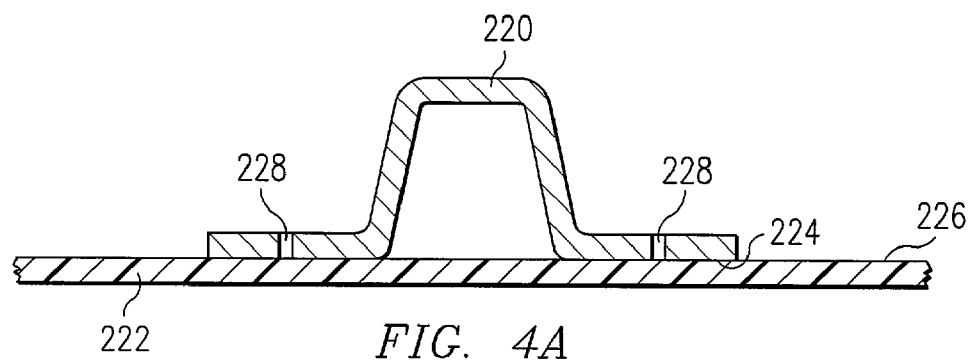
FIG. 4A is a cross-sectional side view of a stiffener and a composite skin, illustrating a step of locating the stiffener on the skin in accordance with an embodiment of the present invention.
Figure 4B:
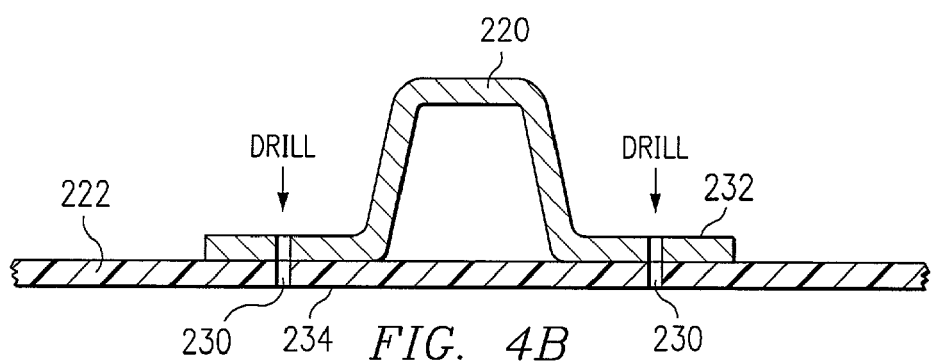
FIG. 4B is another cross-sectional side view of the stiffener and composite skin of FIG. 4A, illustrating a step of back-drilling a hole through the stiffener and skin.
Figure 4C:
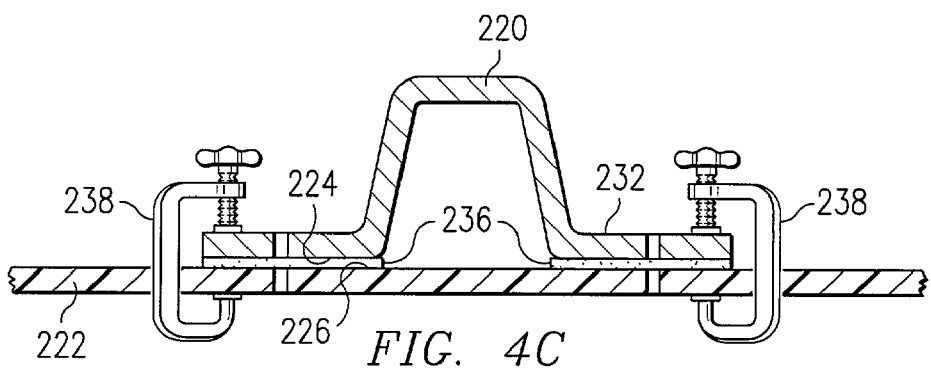
FIG. 4C is yet another cross-sectional side view of the stiffener and composite skin of FIG. 4A, illustrating a step of performing a liquid shimming operation.
Figure 4D:
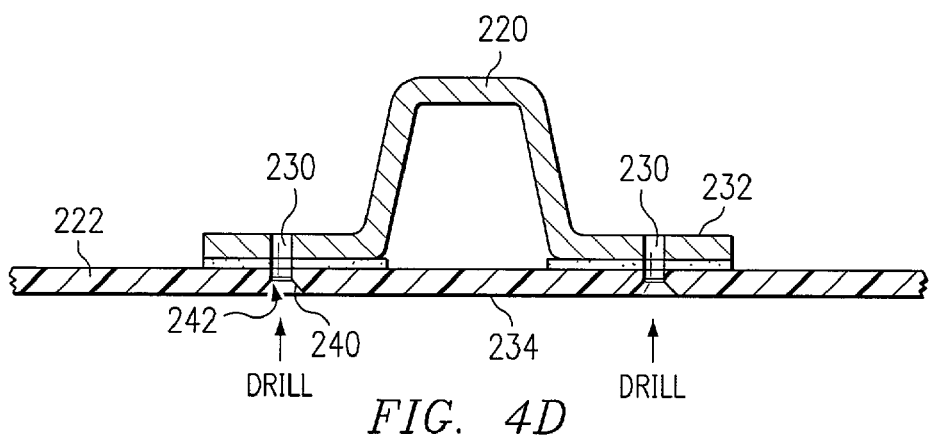
FIG. 4D is still another cross-sectional side view of the stiffener and composite skin of FIG. 4A, illustrating a step of using the drilling apparatus of FIG. 1 to expand the hole of FIG. 4B and form a countersink and a curved transition between the hole and the countersink.

FIGS. 4 through 4D illustrate a method of using drilling apparatus 10 to form a hole and countersink for fastening a stiffener to a composite skin. In particular, FIG. 4 is a flowchart illustrating the method and FIGS. 4A through 4D are schematic diagrams illustrating particular steps of the method.

In general, a stiffener having pre-piloted holes is located on a composite skin surface. A hole having a first diameter is back-drilled through the pre-piloted holes and through the skin surface. A liquid shimming operation is then performed to fill any gaps and provide a flat-to-flat contact between the stiffener and the skin surface. Drilling apparatus 10 is then used to drill through the skin and stiffener. In particular, cutting tool 18 or 134 operates to expand the hole and form a countersink and a smooth transition between the hole and countersink. The depth of the countersink is controlled by countersink limiter 14, and the axial speed, or feed, of cutting tool 18 or 134 is controlled by surge control device 16. This method is described in greater detail below.

As shown in FIGS. 4 and 4A, a stiffener 220 is located on a composite skin 222 at step 200. In particular, a lower surface 224 of stiffener 220 is mated with an upper surface 226 of composite skin 222. Stiffener 220 may be any type of reinforcing member, such as a rib, spar, or hat for example, which can stiffen or increase the strength of composite skin 222. As shown in FIG. 4A, stiffener 220 may include one or more pre-piloted holes 228. In a particular embodiment, pre-piloted holes 228 have a diameter of approximately 0.128 inches. Stiffener 220 may be located on skin 222 such that pre-piloted holes 228 are aligned with particular locations on skin 222. Upper surface 226 of skin 222 may be flat, curved, or otherwise contoured. For example, skin 222 may be a curved skin of an airplane.

At step 202, a hole 230 is back-drilled from an upper surface 232 of stiffener 220 through a lower surface 234 of skin 222 using a first cutting tool, as shown in FIGS. 4 and 4B. In a particular embodiment, hole 230 has a diameter of approximately 0.128 inches. Thus, the first cutting tool may have a diameter of approximately 0.128 inches.

A liquid shimming operation may be performed at steps 204 through 208, as shown in FIGS. 4 and 4C. In general, a liquid shimming operation is performed to provide a flat medium between objects having mating surfaces that are not perfectly flat, such as two graphite surfaces or a graphite surface and a metallic surface for example. The liquid shim fills any gaps between the surfaces, which increases the ability for loads to be transferred between the objects.

At step 204, a liquid shim material 236 is disposed between lower surface 224 of stiffener 220 and upper surface 226 of skin 222. Liquid shim material 236 may be selected based on its high compression strength and thixotropic properties. In some embodiments, liquid shim material 236 is a resin or an epoxy adhesive.

At step 206, stiffener 220 and skin 222 are aligned such that the portions of hole 230 extending through stiffener 220 and skin 222 are aligned, and one or more fasteners 238 are attached to stiffener 220 and skin 222. Fasteners 238 are used to squeeze out additional liquid shim material 236, which helps eliminate any gaps or bubbles in liquid shim material 236, and to hold stiffener 220 and skin 222 in alignment during the curing of liquid shim material 236. Fasteners 238 may be clamps or clips, such as Click-Os, or any other fastener suitable to hold stiffener 220 and skin 222 in alignment. Alternatively, an airbag shimming method may be used to apply constant, even pressure against stiffener 220 or skin 222 during the curing of liquid shim material 236.

At step 208, liquid shim material 236 cures, forming a solid transition between stiffener 220 and skin 222. In an alternative embodiment, liquid shim material 236 is inserted between stiffener 220 and skin 222 after stiffener 220 and skin 222 are aligned and fastened together. For example, liquid shim material 236 may be injected between stiffener 220 and skin 222 and allowed to cure.

At step 210, countersink limiter 14 is adjusted as discussed above with reference to FIG. 1 such that a countersink having a particular depth may be formed by cutting tool 18 or cutting tool 134. The countersink depth may be selected based on one or more criteria, such as for example, the material properties and dimensions of the workpiece, the type and dimension of the fastener to be inserted into the hole and countersink, and whether the fastener should protrude from, be flush with, or be sunken into, the countersink.

At step 212, the tension setting of surge control device 16 is set by setting lever 80 to the drilling position as discussed above with reference to FIGS. 1 and 1A. For example, in the application shown in FIGS. 4A through 4D, lever 80 should be set such that surge control device 16 provides an appropriate amount of resistance to prevent cutting tool 18 or 134 from travelling at an axial speed that may delaminate composite skin 222. In one embodiment, lever 80 is set such that surge control device 16 is activated for at least the drilling portion of the cutting operation.

At step 214, drilling apparatus 10 including cutting tool 18 or 134 is used to enlarge the diameter of hole 230. This cutting operation may be performed in the opposite direction as the back-drilling of hole 230 at step 202. In other words, cutting tool 18 or 134 may enter the lower surface 234 of skin 222 and travel toward upper surface 232 of stiffener 220. During step 214, the axial speed, or feed, of cutting tool 18 or 134 is controlled by surge control device 16 based on the tension setting established at step 210.

At step 216, the tension setting of surge control device 16 is adjusted by moving lever 80 to the countersink position as discussed above with reference to FIGS. 1 and 1A. For example, in the application shown in FIGS. 4A through 4D, lever 80 should be set such that surge control device 16 provides an appropriate amount of resistance to prevent cutting tool 18 or 134 from travelling at an axial speed that may delaminate composite skin 222. In some embodiments, no resistance is required to prevent delamination of composite skin 222 during the countersink operation. Thus, lever 80 may be set such that surge control device 16 is deactivated during the countersink portion of the cutting operation. In other applications, lever 80 is adjusted such that surge control device 16 is still activated during the countersink portion, but set to a different tension level than that used for the drilling operation. In still other applications, a constant tension setting may be appropriate for both the drilling and countersink operations, and thus lever 80 need not be adjusted at step 216.

At step 218, the cutting operation begun at step 214 is continued to form a countersink 240 and a curved transition 242 between hole 230 and countersink 240. The depth of countersink 240 is controlled by countersink limiter 14 based on the depth setting established at step 210. In some applications, the leading end of cutting tool 18 or 134 may pass through upper surface 232 of stiffener 220. During step 218, the axial speed, or feed, of cutting tool 18 or 134 may be controlled by surge control device 16 based on the tension setting established at step 216, depending on whether surge control device 16 was deactivated at step 216.

In some embodiments, such as in particular aerospace applications, the diameter of hole 230 is expanded from about 0.128" to about 0.190" at step 214 such that a bolt having a particular size may be used within hole 230 to fasten stiffener 220 to skin 222. However, in other embodiments, smaller or larger holes may be formed and/or expanded.

It should be understood that the method described above is for a particular embodiment and application. Other embodiments and/or applications of the invention may eliminate certain ones of the steps described above.

Thus, in some embodiments, a single cutting tool 18 or 134 is operable to form and/or expand a hole, form a countersink, and forming a curved transition between the expanded hole and the countersink in a single operation. This eliminates the need to perform separate operations using separate drills or exchanging the cutting tools attached to the drill to perform these separate operations. In particular, using a single cutting tool 18 or 134 eliminates the need to use one cutting tool for expanding the hole, a separate cutting tool for forming the countersink, and a third cutting tool for forming a smooth transition between the expanded hole and the countersink. As discussed above with reference to FIG. 3, using a single cutting 18 or 134 to perform multiple operations saves both time and money, and produces more accurate and consistent countersunk holes.

Although embodiments of the invention and their advantages are described in detail, a person skilled in the art could make various alterations, additions, and omissions without departing from the spirit and scope of the present invention as defined by the appended claims.

What is claimed is:

1. A drilling apparatus, comprising:
   a drill;
   a countersink limiter coupled to the drill;
   a rotatable cutting tool coupled to the countersink limiter and including: a drilling portion operable to form a hole; and
   a countersink portion operable to form a countersink having a depth controlled by the countersink limiter; and
   a surge control device coupled to the drill and operable to control the axial speed of the cutting tool, and
   the cutting tool further comprises a fillet portion disposed between the drilling portion and the countersink portion and operable to form a longitudinally-curved transition between the hole and the countersink.

2. A method of forming a hole and countersink in a composite material, comprising:
   using a first cutting tool to:
   form a hole in the composite material;
   form a countersink aligned with the hole; and
   form a longitudinally-curved transition between the countersink and the hole; and
   applying a surge control device to control the axial speed of the first cutting tool.

3. The apparatus of claim 1, wherein the surge control device is operable to control the axial speed of the cutting tool during cutting by the drilling portion but not during cutting by the countersink portion.

4. The apparatus of claim 1, further comprising a switch operable to deactivate the surge control device during formation of the countersink.

5. The apparatus of claim 1, wherein:
   the drilling portion and the countersink portion are at least partially defined by a plurality of generally longitudinal cutting sections separated by a plurality of channels; and
   each cutting section includes a first portion corresponding to the drilling portion of the body and a second portion corresponding to the countersink portion of the body.

6. The apparatus of claim 5, wherein the first portion of each cutting section comprises a tapered portion and a non-tapered portion.

7. The apparatus of claim 5, wherein each of the plurality of cutting sections comprises a fillet disposed between the first portion and the second portion of the respective cutting section.

8. The apparatus of claim 1, wherein the drilling portion is operable to form a hole by increasing the diameter of an existing hole.

9. The apparatus of claim 8, wherein the drilling portion is operable to increase the diameter of an existing hole from approximately 0.128 inches to approximately 0.190 inches.

10. The apparatus of claim 1, wherein the surge control device comprises a hydraulic damper.

11. A cutting tool comprising:
a body including:
a drilling portion operable to form a hole;
a countersink portion coupled to the drilling portion and operable to form a countersink having a depth; and
a fillet portion disposed between the drilling portion and the countersink portion and operable to form a longitudinally-curved transition between the hole and the countersink;
a countersink limiter; and
a mounting portion coupled to the body and operable to be coupled to the countersink limiter.

12. The cutting tool of claim 11, wherein:
the drilling portion and the countersink portion are at least partially defined by a plurality of generally longitudinal cutting sections separated by a plurality of channels; and
each cutting section includes a first portion corresponding to the drilling portion of the body and a second portion corresponding to the countersink portion of the body.

13. The cutting tool of claim 12, wherein the first portion of each cutting section comprises a tapered portion and a non-tapered portion.

14. The cutting tool of claim 12, wherein:
each of the plurality of cutting sections comprises a fillet disposed between the first portion and the second portion of the respective cutting section; and
the fillet portion of the body comprises the plurality of fillets.

15. The cutting tool of claim 11, wherein the drilling portion is operable to form a hole by increasing the diameter of an existing hole.

16. The cutting tool of claim 11, wherein the drilling portion is operable to increase the diameter of an existing hole from approximately 0.128 inches to approximately 0.190 inches.

17. The cutting tool of claim 11, further comprising a non-cutting pilot portion operable to stabilize the cutting tool in a piloted hole.

18. The method of claim 2, wherein applying the surge control device to control the axial speed of the first cutting tool comprises applying the surge control device while forming the hole but not while forming the countersink.

19. The method of claim 2, further comprising deactivating the surge control device during formation of the countersink.

20. The method of claim 2, wherein the step of forming the hole comprises forming a hole having a first diameter and enlarging the hole to a second diameter.

21. The method of claim 2, further comprising the step of forming a first hole having a first diameter, and wherein the step of forming the hole using the first cutting tool comprises enlarging the first hole to a second diameter.

22. The method of claim 21, wherein the step of forming the first hole having the first diameter comprises using a second cutting tool.

23. The method of claim 22, further comprising positioning a stiffener adjacent a composite skin such that a first surface of the stiffener is in contact with a first surface of the composite skin;
wherein the step of forming the first hole having the first diameter comprises using the second cutting tool to drill through the stiffener and the composite skin in a first direction; and
wherein the step of enlarging the first hole to a second diameter comprises using the first cutting tool to drill through the composite skin and the stiffener in a second direction opposite the first direction.

24. The method of claim 23, wherein:
the stiffener comprises a plurality of pilot holes; and
forming the first hole using the second cutting tool comprises drilling through one of the pilot holes.

25. The method of claim 23, further comprising performing a liquid shimming process comprising:
inserting a liquid shim material between the first surface of the stiffener and the first surface of the composite skin;
maintaining the stiffener and the composite skin together; and
allowing the liquid shim material to cure.

26. The method of claim 25, wherein the liquid shimming process is performed after using the first cutting tool but before using the second cutting tool.

* * * * *